United States Patent

Wu et al.

[11] Patent Number: 6,090,274
[45] Date of Patent: Jul. 18, 2000

[54] HYDROTREATING CATALYST COMPOSITION AND PROCESSES THEREFOR AND THEREWITH

[75] Inventors: An-hsiang Wu, Bartlesville; Charles A. Drake, Nowata, both of Okla.

[73] Assignee: Phillips Petroleum Company, Bartlesville, Okla.

[21] Appl. No.: 09/221,814

[22] Filed: Dec. 29, 1998

[51] Int. Cl.[7] .............................. C10G 45/12; C10G 45/61
[52] U.S. Cl. ................ 208/216 R; 208/209; 208/251 H; 208/254 H; 208/143; 502/64; 502/71; 502/77
[58] Field of Search .................................. 502/64, 71, 77; 208/216 R, 209, 251 H, 254 H, 143

[56] References Cited

U.S. PATENT DOCUMENTS

| | | | |
|---|---|---|---|
| 3,140,251 | 7/1964 | Plank et al. | 208/120 |
| 3,140,252 | 7/1964 | Frilette et al. | 208/120 |
| 3,644,200 | 2/1972 | Young | 208/120 |
| 3,969,276 | 7/1976 | Rosback | 252/455 |
| 4,029,716 | 6/1977 | Kaeding | 260/672 |
| 4,067,920 | 1/1978 | Kaeding | 260/671 |
| 4,101,592 | 7/1978 | Rycheck et al. | 260/666 |
| 4,292,205 | 9/1981 | Bowes | 252/455 |
| 4,325,842 | 4/1982 | Slaugh et al. | 252/443 |
| 4,326,992 | 4/1982 | Slaugh et al. | 252/443 |
| 4,339,353 | 7/1982 | Weisz et al. | 252/455 |
| 4,472,535 | 9/1984 | Chang et al. | 518/714 |
| 4,532,226 | 7/1985 | Chu | 502/71 |
| 4,734,186 | 3/1988 | Parrott et al. | 208/251 |
| 4,851,206 | 7/1989 | Boudart et al. | 423/409 |
| 5,169,819 | 12/1992 | Berrebi | 502/168 |
| 5,500,108 | 3/1996 | Durand et al. | 208/89 |
| 5,599,441 | 2/1997 | Collins et al. | 208/208 |
| 5,685,972 | 11/1997 | Timken et al. | 208/89 |
| 6,034,020 | 3/2000 | Drake et al. | 502/60 |

*Primary Examiner*—Steven P. Griffin
*Assistant Examiner*—Christina Ildebrando
*Attorney, Agent, or Firm*—Richmond, Hitchcock, Fish & Dollar

[57] ABSTRACT

A nitrided calcined modified zeolite composition having incorporated therein a molybdenum promoter and a co-promoter. A carburized nitrided calcined modified zeolite composition having incorporated therein a molybdenum promoter and a co-promoter. Producing the composition by incorporating a molybdenum promoter compound and a co-promoter compound into the zeolite followed by thermal treatment of the resulting zeolite with a nitriding agent and, optionally, further thermally treating the resulting zeolite with a hydrocarbon, preferably in the presence of hydrogen. A hydrotreating process that contacts a hydrocarbon-containing fluid with the nitrided, optionally carburized, calcined modified zeolite composition under a condition sufficient to effect the reduction of sulfur content in the hydrocarbon-containing fluid.

28 Claims, No Drawings

HYDROTREATING CATALYST COMPOSITION AND PROCESSES THEREFOR AND THEREWITH

FIELD OF THE INVENTION

This invention relates to catalyst compositions useful for upgrading hydrocarbons, to a process for producing the compositions, and to a process for using the compositions in a hydrocarbon upgrading process.

BACKGROUND OF THE INVENTION

In a hydrotreating process for treating a hydrocarbon stream, such as catalytically cracked gasoline, the content of sulfur impurities is generally reduced thereby producing a product that can be commercially used. However, most commercial hydrotreating processes, contemporaneous with reduction of sulfur content, also reduce octane number of the petroleum. A second process is, therefore, generally required to increase the octane number. Such multi-step processes greatly increase the cost of the final products.

Accordingly, there is an ever-increasing need to develop catalysts which in a single process promote the simultaneous reduction of sulfur content while retaining or even increasing the octane number of a hydrocarbon. Such development would also be a significant contribution to the art and to the economy.

SUMMARY OF THE INVENTION

An object of this invention is to provide catalyst compositions which can be used in a hydrocarbon upgrading or hydrotreating process. Also an object of this invention is to provide a process for producing the catalyst compositions. Another object of this invention is to provide a process which can employ the catalyst compositions in a hydrotreating process. An advantage of these catalyst compositions is that they can in a single process simultaneously reduce the sulfur content in a hydrocarbon and, at least, substantially retain the octane number of the hydrocarbon. Other objects and advantages will become more apparent as the invention is more fully disclosed hereinbelow.

According to a first embodiment of the present invention, a composition which can be used as a catalyst in hydrotreating process for upgrading a hydrocarbon is provided. The composition is a zeolite having incorporated therein two different promoters. The composition contains molybdenum nitride and, optionally, molybdenum carbide.

According to a second embodiment of the invention, a process for producing a composition which can be used as catalyst in a hydrocarbon upgrading or a hydrotreating process is provided. The process can comprise (1) optionally calcining a zeolite to produce a calcined zeolite; (2) contacting a zeolite or a calcined zeolite with a molybdenum compound and a co-promoter compound under a condition sufficient to incorporate the molybdenum compound and the co-promoter compound into the zeolite to form a modified zeolite; (3) calcining the modified zeolite to produce a calcined modified zeolite; and (4) contacting the modified zeolite with a nitriding agent under conditions sufficient to convert the modified zeolite into a nitrogen-modified zeolite. For the production of a carbon-modified zeolite the nitrogen-modified zeolite is further contacted with a carburizing agent under conditions sufficient to convert the modified zeolite into a carbon-modified zeolite.

According to a third embodiment of the present invention, a process which can be used in a hydrocarbon upgrading process (hereinafter referred to as hydrotreating process) is provided in which contacting a fluid which comprises at least one saturated hydrocarbon, optionally in the presence of an inert fluid such as a hydrogen-containing fluid, with a catalyst composition, which can be the same as disclosed above in the first embodiment of the invention, under conditions effective to reduce the sulfur content in the hydrocarbon while substantially retaining the octane number of the hydrocarbon.

DETAILED DESCRIPTION OF THE INVENTION

According to the first embodiment of the invention, a composition which can be used as catalyst in a hydrotreating process is provided. The composition is a zeolite having incorporated therein a molybdenum promoter and a co-promoter selected from among boron, magnesium, phosphorus, sulfur, tin, titanium and zirconium which has been subjected to a nitriding process and, optionally, then subjected to a carburizing process so that the zeolite composition contains nitrogen and, optionally, carbon wherein the promoters are present in the composition in sulfur-reducing amount to reduce the sulfur content in the hydrocarbon, when the composition is used in a hydrotreating process.

As used herein, the term "hydrocarbon" is generally referred to, unless otherwise indicated, as one or more hydrocarbons, saturated or unsaturated, having 1 to about 50, preferably about 2 to about 40, more preferably about 2 to about 30, and most preferably 2 to 20 carbon atoms per molecule. Also preferably a hydrocarbon is a saturated hydrocarbon, a mixture of saturated hydrocarbons, or a mixture of saturated hydrocarbons and unsaturated hydrocarbons. Examples of such hydrocarbons include, but are not limited to, ethane, propanes, butanes, pentanes, hexanes, gasolines, naphthas, fuel oils, and combinations of two or more thereof.

According to the first embodiment of the invention, the weight ratio of the promoter to the zeolite can be any ratio so long as the ratio can effect the reduction of sulfur content in the hydrocarbon in a hydrotreating process. Generally, the ratio can be in the range of from about 0.0001:1 to about 1:1, preferably about 0.0005:1 to about 1:1, more preferably about 0.001:1 to about 0.9:1 and most preferably from 0.005:1 to 0.75:1 for an effective reduction of sulfur content. Alternatively, the promoter can be present in the catalyst composition in the range of from about 0.01 to about 50, preferably about 0.05 to about 50, more preferably about 0.1 to about 45, and most preferably 0.5 to 40 grams per 100 grams of the catalyst composition.

The weight ratio of carbon or nitrogen to the metal of metal carbide or metal nitride can be in the range of about 0.01:1 to about 50:1, preferably about 0.05:1 to about 30:1, more preferably about 0.1:1 to about 20:1, and most preferably 0.1:1 to 10:1. The presently preferred composition is a ZSM-5 zeolite having incorporated therein a molybdenum carbide and co-promoter compound.

According to the present invention, any promoter that, as compared to use of a zeolite only, can effect the reduction of sulfur content, nitrogen content, or both and substantially retain the octane number of a hydrocarbon in a hydrotreating process can be employed. Presently it is preferred that the compound used as a co-promoter is a compound of boron, magnesium, phosphorus, sulfur, tin, titanium or zirconium. The co-promoter can be in any available oxidation state. For example, molybdenum can have an oxidation state of 2, 3, 4, 5, and 6.

The composition can also be characterized by having the following physical characteristics: a micropore surface area, as determined by the BET method using nitrogen, in the range of from about 50 to about 1,000, preferably 50 to 500 m$^2$/g; a micropore pore volume in the range of from about 0.1 to about 2.0, preferably about 0.1 to about 1.0 ml/g; an average micropore pore diameter in the range of from about 0.1 to about 500, preferably about 1 to about 200 Å; and a porosity of more than about 20%.

Any commercially available zeolites can be employed in the invention. Examples of suitable zeolites include, but are not limited to, those disclosed in Kirk-Othmer Encyclopedia of Chemical Technology, third edition, volume 15 (John Wiley & Sons, New York, 1991). The presently preferred zeolite is a ZSM-5 zeolite.

Any methods known to one skilled in the art for incorporating a compound or a portion thereof into a zeolite such as, for example, impregnation, ion exchange, stirring, extrusion, or any physical mixing, can be employed for producing the composition of the present invention. However, it is presently preferred the composition be produced by the process disclosed in the second embodiment of the invention.

According to the second embodiment of the invention, a zeolite, preferably a ZSM-5 zeolite, can be optionally contacted with one or more suitable binders in a liquid, preferably aqueous medium, to form a zeolite-binder mixture. Any binders known to one skilled in the art for use with a zeolite are suitable for use herein. Examples of suitable binder include, but are not limited to, clays such as for example, kaolinite, halloysite, vermiculite, chlorite, attapulgite, smectite, montmorillonite, illite, saconite, sepiolite, palygorskite, and combinations of two or more thereof; diatomaceous earth; aluminas such as for example α-alumina and γ-alumina; silicas; alumina-silica; aluminum phosphate; aluminum chlorohydrate; and combinations of two or more thereof. Presently preferred is an alumina binder. Because these binders are well known to one skilled in the art, a description thereof is omitted herein. The weight ratio of a zeolite to a binder can be in a wide range and generally in the range of from about 200:1 to about 0.01:1, preferably 100:1 to 0.1:1.

The zeolite and the binder can be well mixed by any means known to one skilled in the art such as stirring, blending, kneading, or extrusion, following which the zeolite-binder mixture can be dried in air at a temperature in the range of from about 20 to about 200° C., preferably about 25 to about 175° C., and most preferably 25 to 150° C. for about 0.5 to about 50 hours, preferably about 1 to about 30 hours, and most preferably 1 to 20 hours, preferably under atmospheric pressure. Thereafter, the dried, zeolite-binder mixture can be further calcined, if desired, in air at a temperature in the range of from about 300 to 1000° C., preferably about 350 to about 750° C., and most preferably 450 to 650° C. for about 1 to about 30 hours to prepare a calcined zeolite-binder. If a binder is not desired, a zeolite can also be calcined under similar conditions to remove any contaminants, if present.

A zeolite, a calcined zeolite, or a calcined zeolite-binder can be treated with a compound containing an exchangeable ammonium ion to prepare an ammonium-exchanged zeolite. Whether a zeolite is calcined or contains a binder, the process or treatment in the second embodiment is the same for each. For the interest of brevity, only a zeolite is described hereinbelow. Examples of suitable ammonium-containing compounds include, but are not limited to, ammonium sulfate, ammonium chloride, ammonium nitrate, ammonium bromide, ammonium fluoride, and combinations of any two or more thereof. Treatment of the zeolite replaces the original ions such as, for example, alkali or alkaline earth metal ions of the zeolite with predominantly ammonium ions. Techniques for such treatment are well known to one skilled in the art such as, for example, ion exchange with the original ions. For example, a zeolite can be contacted with a solution containing a salt of the desired replacing ion or ions.

Generally, a zeolite can be suspended in an aqueous solution of an ammonium-containing compound. The concentration of the zeolite in the aqueous solution can be in the range of from about 0.01 to about 200, preferably about 0.1 to about 150, more preferably about 1 to about 100, and most preferably 5 to 75 grams per liter. The amount of the ammonium-containing compound required depends on the amount of the original ion(s) to be exchanged. Upon the preparation of the solution, the solution can be subject to a temperature in the range of from about 30° C. to about 200° C., preferably about 40° C. to about 150° C., and most preferably 50° C. to 125° C. for about 1 to about 100 hours, preferably about 1 to about 50 hours, and most preferably 2 to 25 hours depending on desired degrees of ion exchange. The treatment can be carried out under a pressure in the range of from about 1 to about 10 atmospheres (atm), preferably about 1 atm or any pressure that can maintain the required temperature. Thereafter, the treated zeolite can be washed with running water for 1 to about 60 minutes followed by drying and calcining to produce calcined zeolite. The drying and calcining processes can be carried out substantially the same as those disclosed above for the preparation of a calcined zeolite or zeolite-binder.

Generally, the ammonium-exchanged zeolite becomes hydrogen exchanged upon calcination or high temperature treatment such that a predominant proportion of its exchangeable cations are hydrogen ions. The above-described ion exchanges of exchangeable ions in a zeolite is well known to one skilled in the art. See, for example, U.S. Pat. No. 5,516,956, disclosure of which is incorporated herein by reference. Because the ion exchange procedure is well known, the description thereof is omitted herein for the interest of brevity.

A zeolite is generally first treated with a promoter compound (a promoter precursor). According to the second embodiment of the present invention, any promoter compound, preferably a metal compound, which can be converted to its metal carbide or metal nitride, as disclosed in the first embodiment of the invention, that, as compared to use of a zeolite only, can effect the retention of substantial octane number of the hydrocarbon and substantial reduction of the sulfur content, nitrogen content, or both in a hydrocarbon during a hydrotreating process of the hydrocarbon can be employed. Presently it is preferred that a molybdenum compound be used with a co-promoter selected from compounds of boron, magnesium, phosphorus, sulfur, tin, titanium and zirconium.

Generally, any molybdenum containing compounds which, when incorporated into a zeolite, are effective to enhance the conversion of a $C_9$+ aromatic compound can be used in the present invention. Suitable molybdenum-containing compounds include, but are not limited to, molybdenum chloride, molybdenum acetate, molybdenum fluoride, molybdenum hexacarbonyl, molybdenum sulfide, sodium molybdates, potassium molybdates, molybdenum oxychloride, molybdenum sulfide, ammonium tetrathiomolybdate, ammonium molybdate, ammonium dimolybdate, ammonium heptamolybdate, molybdenum oxides in which the oxidation state of Mo can be 2, 3, 4, 5, and 6, and combinations of two or more thereof.

Examples of suitable boron compounds include, but are not limited to, boric acid, borane-ammonium complex, boron trichloride, boron phosphate, boron nitride, triethyl borane, trimethyl borane, tripropyl borane, trimethyl borate, triethyl borate, tripropyl borate, trimethyl boroxine, triethyl boroxine, tripropyl boroxine and combinations of any two or more thereof.

Examples of suitable magnesium-containing compounds include, but are not limited to, magnesium formate, magnesium acetate, magnesium bromide, magnesium bromide diethyletherate, magnesium chloride, magnesium fluoride, magnesium nitrate, magnesium sulfate, dibutyl magnesium, magnesium methoxide and combinations of any two or more thereof.

Examples of suitable tin-containing compounds include, but are not limited to, stannous acetate, stannic acetate, stannous bromide, stannic bromide, stannous chloride, stannic chloride, stannous oxalate, stannous sulfate, stannic sulfate, stannous sulfide and combinations of any two or more thereof.

Examples of suitable titanium compounds include, but are not limited to, titanium tetramides, titanium tetramercaptides, titanium tetrabutoxide, titanium tetramethoxides, titanium tetraethoxide, titanium tetrapropoxide, titanium tetrachloride, titanium trichloride, titanium bromides, and combinations of two or more thereof.

Similarly, examples of suitable zirconium compounds include, but are not limited to, zirconium acetate, zirconium formate, zirconium chloride, zirconium bromide, zirconium butoxide, zirconium tert-butoxide, zirconium chloride, zirconium citrate, zirconium ethoxide, zirconium methoxide, zirconium propoxide, and combinations of two or more thereof.

Examples of the other co-promoter compounds are well known to one skilled in the art, the description thereof is omitted herein for the interest of brevity.

Generally, a zeolite, calcined zeolite, zeolite-binder, calcined zeolite-binder, can be combined with such promoter precursor in any suitable weight ratios which would result in the weight ratios of a promoter to a zeolite disclosed in the first embodiment of the invention. The combination can be carried out by any means known to one skilled in the art. For example, a metal compound can be physically mixed or blended with a zeolite by stirring, extrusion, blending, kneading, or combinations of two or more thereof. Also for example, a metal compound can be combined with a zeolite by extrusion or impregnation. Presently it is preferred that such combination of zeolite and metal compound be carried out by physical mixing or in a suitable liquid, preferably an aqueous medium, to form an incipient wetness zeolite-precursor mixture or a modified zeolite. The combinations can be carried out at about 10° C. to about 120° C. for about 5 minutes to about 20 hours. The quantity of a promoting compound required is the quantity that can produce the composition disclosed in the first embodiment of the invention.

Thereafter, the modified zeolite is contacted with an nitriding agent under conditions sufficient to incorporate nitrogen into the modified zeolite. For the production of a nitride-incorporated zeolite or a zeolite having incorporated therein a nitrogen-modified element, the following process is employed preferably using ammonia gas as the nitriding agent. The contacting condition can include a temperature in the range of from about 150° C. to about 1,000° C., preferably about 200° C. to about 800° C., and most preferably 275° C. to 750° C., under a pressure that can accommodate these temperature ranges, and for about 1 to about 20, preferably about 2 to about 15, and most preferably 3 to 10 hours. Preferably the contacting is carried out in the presence of a gas that is inert to the contacting of the modified zeolite and hydrocarbon, such as hydrogen, helium, argon, nitrogen, and combinations of two or more thereof. The presently preferred inert gas is hydrogen at a flow of about 0.1 to about 10,000, preferably about 1 to 1,000 g of hydrogen per g of the modified zeolite.

For the carburizing of the zeolite generally any aliphatic hydrocarbon, straight- or branch-chained, can be used. Similarly, any aromatic hydrocarbons, non-substituted or substituted, can also be used. However, it is preferred that the hydrocarbon has 1 to about 20, preferably about 1 to about 15, and most preferably 1 to 10 carbon atoms per molecule. Examples of suitable hydrocarbon include, but are not limited to, methane, ethane, propane, butanes, isobutane, pentanes, hexanes, heptanes, octanes, nonanes, benzene, toluene, or combinations of two or more thereof. In this step, a carbon-modified zeolite is produced. The quantity of hydrocarbon required is the quantity that can result in the composition disclosed in the first embodiment of the invention. The quantity of carbon incorporated can be determined by any means known to one skilled in the art such as, for example, thermal gravimetric analysis. The contacting conditions are the same as related for the nitriding.

In the next step of the process, the nitrogen-modified, optionally carbon-modified, zeolite is subject to thermal treatment, in hot air or steam, under a condition that can include a temperature in the range of from about 300° C. to about 1000° C., preferably about 350° C. to about 900° C., and most preferably 400° C. to 750° C. under a pressure that can accommodate the temperatures and is generally in the range of from about 1 to about 10, preferably about 1, atmospheres for a period in the range of from about 1 to about 30, preferably about 1 to about 20, and most preferably 1 to 15 hours. Upon completion of incorporating or impregnating the nitride and, optionally, carbon into the zeolite by thermal treatment, a promoted zeolite is formed.

The composition of the invention then can be, if desired, pretreated with a reducing agent before being used in a hydrocarbon hydrotreating process. The presently preferred reducing agent is a hydrogen-containing fluid which comprises molecular hydrogen ($H_2$) in the range of from 1 to about 100, preferably about 5 to about 100, and most preferably 10 to 100 volume %. The reduction can be carried out at a temperature, in the range of from about 250° C. to about 800° C. for about 0.1 to about 10 hours preferably about 300° C. to about 700° C. for about 0.5 to about 7 hours, and most preferably 350° C. to 650° C. for 1 to 5 hours.

According to the third embodiment of the present invention, a fluid stream is contacted with a catalyst composition, optionally in the presence of an inert gas which is preferably a hydrogen-containing fluid, under a condition sufficient to effect the reduction of sulfur content, nitrogen content, or both wherein said fluid stream comprises a hydrocarbon or hydrocarbon mixture which comprises at least one saturated hydrocarbon and can further comprise paraffins, olefins, naphthas, naphthenes, or combinations of two or more thereof. The catalyst composition is the same as that disclosed in the first embodiment of the invention which can be prepared by the second embodiment of the invention.

The process is also preferably carried out under a condition that can substantially retain the octane number of the hydrocarbon being hydrotreated.

The term "fluid" is used herein to denote gas, liquid, vapor, or combinations thereof. Any fluid which contains a saturated hydrocarbon can be used in the process of this invention. Generally, the fluid stream can also contain olefins, naphthenes (cycloalkanes), or some aromatic compounds. Examples of suitable, available fluid feeds include, but are not limited to, catalytically cracked gasolines, pyrolysis gasolines from thermal cracking of saturated hydrocarbons, coker naphthas produced by the coking of residual charge stocks, naphthas, gas oils, reformates, fuel oils, and combinations of two or more thereof. The origin of the fluid feed is not critical. Though particular composition of a feed is not critical, a preferred fluid feed is derived from the lights fraction in the product stream of an aromatization process of gasolines such as ethane, propanes, butanes, pentanes, or combinations of two or more thereof.

The fluid feed stream also comprises sulfur compounds, generally in the range of about 0.0001 weight % to about as high as 1 weight % or even about 2 weight %, preferably about 0.001 weight % to about 0.5 weight %. Examples of sulfur compounds include, but are not limited to, hydrogen sulfide, carbon sulfide, carbon disulfide, organic sulfides, organic disulfides, organic trisulfides, organic polysulfides, mercaptans, thiophenes, and combinations of two or more thereof.

Any hydrogen-containing fluid which comprises, consists essentially of, or consists of, molecular hydrogen ($H_2$) can be used in the process of this invention. This hydrogen-containing fluid can contain $H_2$ in the range of from about 1 to about 100, preferably about 5 to about 100, and most preferably 10 to 100 volume %. If the $H_2$ content in the fluid is less than 100%, the remainder of the fluid may be any inert gas such as, for example, $N_2$, He, Ne, Ar, steam, or combinations of two or more thereof, or any other fluid which does not significantly affect the process or the catalyst composition used therein.

The contacting of a fluid feed stream containing a hydrocarbon with the catalyst composition can be carried out in any technically suitable manner, in a batch or semicontinuous or continuous process, under a condition effective to hydrotreat a hydrocarbon. Generally, a fluid stream as disclosed above, preferably being in the vaporized state, is introduced into a suitable hydroprocessing reactor having a fixed catalyst bed, or a moving catalyst bed, or a fluidized catalyst bed, or combinations of two or more thereof by any means known to one skilled in the art such as, for example, pressure, meter pump, and other similar means. Because a hydroprocessing reactor and process therewith are well known to one skilled in the art, the description of which is omitted herein for the interest of brevity. The condition of the process of the invention can include a weight hourly space velocity of the fluid feed stream in the range of about 0.01 to about 100, preferably about 0.05 to about 50, and most preferably 0.1 to 30 g feed/g catalyst/hour. The hydrogen-containing fluid (gas) hourly space velocity generally is in the range of about 1 to about 10,000, preferably about 5 to about 7,000, and most preferably 10 to 10,000 $ft^3$ $H_2/ft^3$ catalyst/hour. Generally, the pressure can be in the range of from about 0 to about 2000 psig, preferably about 0 to about 1000 psig, and most preferably 0 to 750 psig, and the temperature is about 150 to about 1000° C., preferably about 200 to about 750° C., and most preferably 250 to 700° C.

The process effluent generally has reduced sulfur content, reduced nitrogen content, or both and has substantially the same octane number as the feed stream. The process effluent can be recovered and processed by any means known to one skilled in the art.

After the catalyst composition has been deactivated by, for example, coke deposition or feed poisons, to an extent that the sulfur reduction, or nitrogen reduction, or octane number retention has become unsatisfactory, the catalyst composition can be reactivated by any means known to one skilled in the art such as, for example, calcining in air to bum off deposited coke and other carbonaceous materials, such as oligomers or polymers, preferably at a temperature of about 400 to about 1000° C. The optimal time periods of the calcining depend generally on the types and amounts of deactivating deposits on the catalyst composition and on the calcination temperatures. These optimal time periods can easily be determined by those possessing ordinary skills in the art and are omitted herein for the interest of brevity.

The following examples are presented to further illustrate this invention and are not to be construed as unduly limiting the scope of the present invention.

EXAMPLE I

This example illustrates the preparation of several hydrotreating catalysts comprising ZSM-5 zeolite.

Catalyst A (Mo-promoted ZSM-5): Catalyst A was a molybdenum-promoted ZSM-5 catalyst which was prepared as follows. An $Al_2O_3$-bound ZSM-5 zeolite (about 30 weight % alumina) having the form of $\frac{1}{16}$ inch extrudates with a product designation of T-4480 was obtained from UCI (United Catalysts, Inc., Louisville, Ky.). A quantity of 13.07 g of this alumina-bound zeolite was impregnated with 7.22 grams of an aqueous solution containing 20 wt percent $(NH_4)_6Mo_7O_{24} \cdot 4H_2O$. The molybdate-impregnated material was dried at 25° C. for 6 hours and calcined in air at 538° C. for 6 hours to produce 13.21 g of catalyst A. Catalyst A contained 5.940 weight % Mo.

Catalyst B (Carburized Mo-promoted ZSM-5): Catalyst B was a carburized Mo-promoted ZSM-5 catalyst which was prepared by heating a portion (9.99 g) of Catalyst A in a gas mixture of methane (flow rate: 100 ml/minute) and hydrogen (flow rate: 400 ml/minute) at 700° C. for 6 hours to provide 9.73 g of Catalyst B.

Catalyst C (Nitrided calcined Mo-promoted ZSM-5) Catalyst C was a nitrided calcined Mo-promoted ZSM-5 zeolite produced by treating a 24.62 g quantity (6.189 wt. percent Mo) of catalyst produced as set out for Catalyst A by contact with an ammonia stream for 6 hours at 700° C. to provide 24.73 g of nitrided calcined Mo-promoted ZSM-5 zeolite.

Catalyst D (Carburized nitrided calcined Mo-promoted ZSM-5) Catalyst D was a carburized nitrided Mo-promoted ZSM-5 catalyst which was prepared by heating a portion (21.24 g) of Catalyst C in a gas mixture of methane (flow rate: 100 ml/minute) and hydrogen (flow rate: 400 ml/minute) at 700° C. for 2 hours to provide 20.52 g of Catalyst D.

Catalyst E (Nitrided Calcined Mo/Mg-promoted ZSM-5) A quantity of 21.88 g of the alumina-bound zeolite used in Catalyst A was impregnated with 222.4 grams of an aqueous solution containing 5 wt percent $Mg(NO_3)_2 \cdot 6H_2O$. The magnesium-impregnated material was heated for 16 hours at 90°, washed and dried at 25° C. for 6 hours and calcined in air at 538° C. for 6 hours to produce 20.47 g of catalyst calcined Mg-promoted ZSM-5. This material was admixed with 13.02 g an aqueous solution containing 20 wt percent $(NH_4)_6Mo_7O_{24} \cdot 4H_2O$. The Mo-impregnated calcined Mg-promoted ZSM-5 was calcined in air at 538° C. for 6 hours to produce 22.52 g of calcined Mo/Mg-promoted ZSM-5. This material was treated by contact with an ammonia stream for 2 hours at 700° C. to provide 22.39 g of nitrided calcined Mo/Mg-promoted ZSM-5 zeolite.

Catalyst F (Carburized Nitrided Calcined Mo/Mg-promoted ZSM-5) A quantity of 19.13 g of Catalyst E was treated by heating in a gas mixture of methane (flow rate: 100 ml/minute) and hydrogen (flow rate: 400 ml/minute) at 700° C. for 2 hours to provide 18.50 g of Catalyst F.

Catalyst G (Calcined MO/S-promoted ZSM-5) A quantity of 20.31 g of the alumina-bound zeolite used in Catalyst A was impregnated with 9.31 grams of an aqueous solution containing 20 wt percent $(NH_4)_2S$. The sulfur-impregnated material was dried at 25° C. for 6 hours and calcined in air at 538° C. for 6 hours to produce 19.07 g of catalyst calcined S-promoted ZSM-5. This material was admixed with 12.34 g an aqueous solution containing 20 wt percent $(NH_4)_6Mo_7O_{24}\cdot 4H_2O$. The Mo-impregnated calcined S-promoted ZSM-5 was calcined in air at 538° C. for 6 hours to produce 21.11 g of calcined Mo/S-promoted ZSM-5.

Catalyst H (Nitrided Calcined MO/S-promoted ZSM-5) A quantity 17.63 g of Catalyst G was treated by contact with an ammonia stream of 150 ml/min for 2 hours at 700° C. to provide 16.97 g of nitrided calcined Mo/S-promoted ZSM-5 zeolite.

Catalyst I (Carburized Nitrided Calcined Mo/S-promoted ZSM-5) A quantity of 13.51 g of Catalyst H was treated by heating in a gas mixture of methane (flow rate: 150 ml/minute) and hydrogen (flow rate: 600 ml/minute) at 700° C. for 2 hours to provide 18.50 g of Catalyst I.

Catalyst J (Calcined MO/B-promoted ZSM-5) A quantity of 20.46 g of the alumina-bound zeolite used in Catalyst A was impregnated with 9.12 grams of an aqueous solution containing 5 wt percent $H_3BO_3$. The boron-impregnated material was dried at 25° C. for 6 hours and calcined in air at 538° C. for 6 hours to produce 19.28 g of catalyst calcined B-promoted ZSM-5. This material was admixed with 12.63 g an aqueous solution containing 20 wt percent $(NH_4)_6Mo_7O_{24}\cdot 4H_2O$. The Mo-impregnated calcined B-promoted ZSM-5 was calcined in air at 538° C. for 6 hours to produce 21.24 g of calcined Mo/B-promoted ZSM-5.

Catalyst K (Nitrided Calcined MO/B-promoted ZSM-5) A quantity 17.84 g of Catalyst J was treated by contact with an ammonia stream of 150 ml/min for 2 hours at 700° C. to provide 17.40 g of nitrided calcined Mo/B-promoted ZSM-5 zeolite.

Catalyst L (Carburized Nitrided Calcined Mo/B-promoted ZSM-5) A quantity of 13.97 g of Catalyst K was treated by heating in a gas mixture of methane (flow rate: 150 ml/minute) and hydrogen (flow rate: 600 ml/minute) at 700° C. for 2 hours to provide 13.88 g of Catalyst L.

Catalyst M (Calcined MO/P-promoted ZSM-5) A quantity of 21.10 g of the alumina-bound zeolite used in Catalyst A was impregnated with 9.70 grams of an aqueous solution containing 5 wt percent $H_3PO_4$. The boron-impregnated material was dried at 25° C. for 6 hours and calcined in air at 538° C. for 6 hours to produce 19.99 g of catalyst calcined P-promoted ZSM-5. This material was admixed with 12.44 g an aqueous solution containing 20 wt percent $(NH_4)_6Mo_7O_{24}\cdot 4H_2O$. The Mo-impregnated calcined P-promoted ZSM-5 was calcined in air at 538° C. for 6 hours to produce 21.97 g of calcined Mo/B-promoted ZSM-5.

Catalyst N (Nitrided Calcined MO/P-promoted ZSM-5) A quantity 18.50 g of Catalyst M was treated by contact with an ammonia stream of 150 ml/min for 2 hours at 700° C. to provide 17.97 g of nitrided calcined Mo/P-promoted ZSM-5 zeolite.

Catalyst O (Carburized Nitrided Calcined Mo/P-promoted ZSM-5) A quantity of 14.60 g of Catalyst N was treated by heating in a gas mixture of methane (flow rate: 150 ml/minute) and hydrogen (flow rate: 600 ml/minute) at 700° C. for 2 hours to provide 14.56 g of Catalyst O.

Catalyst P (Calcined MO/Zr-promoted ZSM-5) A quantity of 24.00 g of the alumina-bound zeolite used in Catalyst A was impregnated with 14.00 grams of an aqueous solution containing 5 wt percent $ZrOCl_2\cdot 8H_2O$ and 20 wt percent $(NH_4)_6Mo_7O_{24}\cdot 4H_2O$ (an atomic ratio of Mo/Zr=73). The Mo/Zr-impregnated ZSM-5 was calcined in air at 538° C. for 6 hours to produce 23.72 g of calcined Mo/Zr-promoted ZSM-5.

Catalyst Q (Nitrided Calcined MO/Zr-promoted ZSM-5) A quantity 20.42 g of Catalyst P was treated by contact with an ammonia stream of 150 ml/min for 2 hours at 700° C. to provide 19.95 g of nitrided calcined Mo/Zr-promoted ZSM-5 zeolite.

Catalyst R (Carburized Nitrided Calcined Mo/Zr-promoted ZSM-5) A quantity of 19.95 g of Catalyst Q was treated by heating in a gas mixture of methane (flow rate: 150 ml/minute) and hydrogen (flow rate: 600 ml/minute) at 700° C. for 2 hours to provide 16.62 g of Catalyst R.

Catalyst S (Calcined MO/Ti-promoted ZSM-5) A quantity of 20.41 g of the alumina-bound zeolite used in Catalyst A was impregnated with 9.29 grams of an aqueous solution containing 10 wt percent Tyzor TE (titanium (4+) salt of 2,2',2"-nitrilotris-ethanol). The titanium-impregnated material was dried at 25° C. for 6 hours and calcined in air at 538° C. for 6 hours to produce 19.12 g of calcined Ti-promoted ZSM-5. This material was admixed with 12.14 g an aqueous solution containing 20 wt percent $(NH_4)_6Mo_7O_{24}\cdot 4H_2O$. The Mo-impregnated calcined Ti-promoted ZSM-5 was calcined in air at 538° C. for 6 hours to produce 21.20 g of calcined Mo/Ti-promoted ZSM-5.

Catalyst T (Nitrided Calcined MO/Ti-promoted ZSM-5) A quantity 17.68 g of Catalyst S was treated by contact with an ammonia stream of 150 mL/min for 2 hours at 700° C. to provide 17.07 g of nitrided calcined Mo/Ti-promoted ZSM-5 zeolite.

Catalyst U (Carburized Nitrided Calcined Mo/Ti-promoted ZSM-5) A quantity of 13.77 g of Catalyst T was treated by heating in a gas mixture of methane (flow rate: 150 ml/minute) and hydrogen (flow rate: 600 ml/minute) at 700° C. for 2 hours to provide 13.69 g of Catalyst U.

Catalyst V (Calcined MO/Sn-promoted ZSM-5) A quantity of 20.36 g of the alumina-bound zeolite used in Catalyst A that had been calcined at 500° C. for 4 hours was impregnated with 8.27 grams of $Bcl_3SnOAc$ in a $C_4$–$C_6$ solution. The Tin-impregnated material was dried at 25° C. for 6 hours and calcined in air at 538° C. for 6 hours to produce 20.24 g of calcined Sn-promoted ZSM-5. This material was admixed with 13.19 g an aqueous solution containing 20 wt percent $(NH_4)_6Mo_7O_{24}\cdot 4H_2O$. The Mo-impregnated calcined SN-promoted ZSM-5 was calcined in air at 538° C. for 6 hours to produce 22.25 g of calcined Mo/Sn-promoted ZSM-5.

Catalyst W (Nitrided Calcined MO/Sn-promoted ZSM-5) A quantity 18.93 g of Catalyst V was treated by contact with an ammonia stream of 150 mL/min for 2 hours at 700° C. to provide 18.51 g of nitrided calcined Mo/Ti-promoted ZSM-5 zeolite.

Catalyst X (Carburized Nitrided Calcined Mo/Sn-promoted ZSM-5) A quantity of 15.20 g of Catalyst W was treated by heating in a gas mixture of methane (flow rate: 150 ml/minute) and hydrogen (flow rate: 600 ml/minute) at 700° C. for 2 hours to provide 15.10 g of Catalyst X.

EXAMPLE II

This example illustrates the use of the above-described catalysts in the aromatization of gasoline.

A stainless steel reactor tube (inner diameter: 2.5 cm; length: 60 cm) was filled with a 20 ml bottom layer of Alundum® alumina (inert, low surface alumina, Norton Company, Worcester, Mass.), 3.1 to 3.4 grams of one of the catalysts of Example I in the middle, and 20 ml top layer of Alundum® alumina. The reactor was heated to a reaction temperature of about 365° C. to about 370° C. The feed was a catalytically cracked gasoline (CCG) obtained from a Phillips Petroleum Company refinery and was introduced at a rate of about 20 ml/hour (equivalent to a weight hourly space velocity of 4.5–4.8 g/g catalyst/hour), together with hydrogen gas at a rate of 15.6 l/hour. The reaction pressure was about 500 psig.

The reactor effluent was cooled and separated into a gaseous phase and a liquid phase by passing it through a wet ice trap for liquid product collection and then through a wet test meter for gas volume measurement. The liquid was weighed hourly and analyzed on a Hewlett-Packard 5890 gas chromatograph equipped with a fused silica column (DB-1). The gas was sampled hourly and analyzed on a Hewlett-Packard 5890 gas chromatograph using a HP-PLOT/$Al_2O_3$ column. The gas was also analyzed for hydrogen content on a Carle gas chromatograph using a hydrocarbon trap followed by a 13× molecular sieve column. Pertinent test results after run times of about 5–7 hours are summarized in Table I.

In Table I below, $C_5+$ yield denotes total hydrocarbon molecules having 5 or more carbon atoms and RON refers to research octane number. The composition of the feed, CCG, is given at the bottom of Table I.

TABLE I

CCG Upgrade using HZSM5-supported Molybdenum Catalysts

| Catalyst | $C_5$ + Yield Wt % | Sulfur ppmw | Nitrogen ppmw | Olefin Wt % | Benzene Wt % | RON |
|---|---|---|---|---|---|---|
| A | 60.85 | 44.2 | — | 0.385 | 2.814 | 96.82 |
| B | 41.32 | 23.0 | — | 0.344 | 3.506 | 99.61 |
| C | 85.21 | 28.0 | — | 2.849 | 0.916 | 84.88 |
| D | 71.41 | 23.0 | — | 1.785 | 1.432 | 87.36 |
| E | 81.23 | 5.0 | — | 0.593 | 1.226 | 86.55 |
| F | 74.11 | 8.0 | — | 0.409 | 2.367 | 91.32 |
| G | 36.00 | 30.0 | 21.0 | 0.315 | 4.354 | 101.63 |
| H | 87.57 | 21.0 | 4.0 | 1.835 | 0.923 | 85.99 |
| I | 88.42 | 12.5 | 3.0 | 5.884 | 1.006 | 91.85 |
| J | 44.87 | 63.0 | 11.8 | 0.412 | 3.387 | 98.31 |
| K | 62.73 | 4.0 | 7.6 | 0.506 | 1.400 | 85.63 |
| L | 91.40 | 14.5 | 4.0 | 6.912 | 0.913 | 88.91 |
| M | 54.56 | 4.0 | 16.0 | 0.448 | 2.469 | 94.74 |
| N | 75.98 | 6.0 | 6.0 | 0.703 | 1.471 | 86.93 |
| O | 87.01 | 16.0 | 3.0 | 6,587 | 1.076 | 91.17 |
| P | 43.50 | 9.0 | 9.3 | 0.423 | 3.531 | 100.19 |
| Q | 75.46 | 10.0 | 4.0 | 0.992 | 1.550 | 87.69 |
| R | 81.40 | 3.5 | 1.0 | 0.479 | 2.749 | 95.95 |
| S | 32.34 | 9.0 | 11.5 | 0.297 | 4.320 | 102.70 |
| T | 80.84 | 3.0 | <1 | 0.432 | 1.862 | 89.56 |
| U | 90.51 | 3.0 | <1 | 7.575 | 1.263 | 92.58 |
| V | 41.51 | 25.0 | 4.0 | 0.423 | 2.863 | 97.70 |
| W | 66.85 | 4.0 | 0.3 | 0.438 | 1.414 | 86.57 |
| X | 86.17 | 6.0 | 1.0 | 5.999 | 1.086 | 91.52 |
| Wt % Composition CCG | | 210.0 | 46.0 | 26.995 | 1.220 | 89.20 |

Test data in Table I clearly show the advantages of the carburized nitrided ZSM-5 catalysts of this invention (catalysts D, F, I, L, O, R, U and X) over uncarburized nitrided ZSM-5 catalysts (C, E, H, K, N, Q, T and W): lower undesirable nitrogen content (all cases except Sn-promoted); higher desirable products, $C_5+$ hydrocarbons (all cases except Mo and Mo/Mg-promoted) and an increase in octane number (all cases).

The results shown in the above examples demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A composition comprising a ZSM-5 zeolite having incorporated therein a nitrided promoter incorporating molybdenum in combination with a co-promoter chosen from among the group consisting of boron, magnesium, phosphorus, sulfur, tin, titanium and zirconium thereby providing a nitrided co-promoted ZSM-5 zeolite.

2. A composition according to claim 1 wherein the nitrided co-promoted ZSM-5 zeolite is a carburized nitrided co-promoted ZSM-5 zeolite.

3. A composition according to claim 1 wherein the weight ratio of said promoter to said zeolite is in the range of from about 0.0001:1 to about 1:1.

4. A composition according to claim 2 wherein the weight ratio of said promoter to said zeolite is in the range of from about 0.0001:1 to about 1:1.

5. A composition according to claim 1 wherein the weight ratio of said promoter to said zeolite is in the range of from 0.005:1 to 0.75:1.

6. A composition according to claim 2 wherein the weight ratio of said promoter to said zeolite is in the range of from 0.005:1 to 0.75:1.

7. A composition according to claim 2 wherein at least one promoter is a metal carbide and the weight ratio of carbon to said metal is in the range of from about 0.01:1 to about 50:1.

8. A composition according to claim 2 wherein at least one promoter is a metal carbide and the weight ratio of carbon to said metal is in the range of from 0.1:1 to 10:1.

9. A composition according to claim 7 wherein the weight ratio of carbon to said metal is in the range of from 0.1:1 to 10:1.

10. A composition comprising a ZSM-5 zeolite having impregnated thereon a promoter comprising nitrogen, molybdenum and at least one co-promoter selected from the group consisting of boron, magnesium, phosphorus, sulfur, tin, titanium and zirconium.

11. A composition according to claim 10 wherein the promoter further comprises carbon.

12. A process for producing a zeolite composition comprising
 (1) contacting a ZSM-5 zeolite with (a) at least one molybdenum compound and (b) at least one compound comprising boron, magnesium, phosphorus, sulfur, tin, titanium and zirconium under a condition sufficient to incorporate said (a) and (b) compounds into said zeolite to form a modified zeolite;
 (2) calcining said modified zeolite to produce a calcined modified zeolite; and
 (3) contacting said calcined modified zeolite under nitriding conditions with a nitriding agent to provide a nitrided calcined modified zeolite.

13. A process according to claim 12 wherein the nitriding agent is ammonia.

14. A process according to claim 13 wherein said nitrided calcined modified zeolite is contacted with a carburizing agent under carburizing conditions.

15. A process according to claim 14 wherein the carburizing agent is a hydrocarbon.

16. A process according to claim 15 wherein the hydrocarbon is chosen from among lower alkanes.

17. A process according to claim 16 wherein the lower alkane is methane.

18. A process comprising contacting a first hydrocarbon-containing fluid, which comprises at least one saturated hydrocarbon, with a catalyst composition to produce a second hydrocarbon-containing fluid wherein said catalyst composition comprises a ZSM-5 zeolite having incorporated therein a promoter comprising at least molybdenum nitride and a nitride of a co-promoter selected from the group consisting of boron, magnesium, phosphorus, sulfur, tin, titanium and zirconium.

19. A process according to claim 18 wherein the weight ratio of said promoters to said zeolite is in the range of from 0.005:1 to 0.75:1.

20. A process according to claim 18 wherein at least one promoter is a metal carbide and the weight ratio of carbon to metal is in the range of from 0.1:1 to 10:1.

21. A process according to claim 20 wherein said catalyst composition consists essentially of a ZSM-5 zeolite having impregnated thereon nitrogen and carbon and at least an oxide of molybdenum and an oxide of a co-promoter wherein the weight ratio of said promoter to said zeolite is in the range of from about 0.0001:1 to about 1:1 and the weight ratio of carbon to metal is in the range of from about 0.01:1 to about 50:1.

22. A process according to claim 21 wherein the weight ratio of said promoter to said zeolite is in the range of from 0.005:1 to 0.75:1 and the weight ratio of carbon to metal is in the range of from 0.1:1 to 10:1.

23. A process according to claim 18 wherein said first hydrocarbon-containing fluid comprises at least one sulfur compound and said contacting is carried out in the presence of a hydrogen-containing fluid.

24. A process according to claim 21 wherein said first hydrocarbon-containing fluid comprises at least one sulfur compound and said contacting is carried out in the presence of a hydrogen-containing fluid.

25. A hydrotreating process comprising contacting, in the presence of a hydrogen-containing fluid, a hydrocarbon fluid comprising at least one saturated hydrocarbon and at least one sulfur compound with a catalyst composition under a condition sufficient to reduce the sulfur compound content in said fluid wherein said catalyst composition is prepared by the steps comprising: (1) contacting a ZSM-5 zeolite with a molybdenum compound and a co-promoting compound selected from the group consisting of boron, magnesium, phosphorus, sulfur, tin, titanium and zirconium under a condition sufficient to incorporate said promoters onto said zeolite to form a modified zeolite; (2) calcining said modified zeolite to produce a calcined modified zeolite; and (3) contacting said calcined modified zeolite with ammonia under nitriding conditions to provide a nitrided calcined modified zeolite.

26. A process according to claim 25 wherein said nitrided calcined modified zeolite is further contacted with a carburizing agent under carburizing conditions to provide a carburized nitrided calcined modified zeolite.

27. A process according to claim 25 wherein said hydrocarbon fluid is selected to form the group consisting of naphthas, coker naphtha, catalytically cracked gasolines, pyrolysis gasolines, and combinations of two or more thereof.

28. A process according to claim 26 wherein said hydrocarbon fluid is selected to form the group consisting of naphthas, coker naphtha, catalytically cracked gasolines, pyrolysis gasolines, and combinations of two or more thereof.

* * * * *